United States Patent
Luo

(10) Patent No.: US 7,453,662 B2
(45) Date of Patent: Nov. 18, 2008

(54) ESTIMATING RESIDUAL TEMPERATURE FOR FLYING HEIGHT ADJUSTMENT OF READ/WRITE HEADS

(75) Inventor: Jihao Luo, Shrewsbury, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/685,260

(22) Filed: Mar. 13, 2007

(65) Prior Publication Data
US 2007/0268610 A1  Nov. 22, 2007

Related U.S. Application Data

(60) Provisional application No. 60/747,619, filed on May 18, 2006.

(51) Int. Cl.
*G11B 21/02* (2006.01)
(52) U.S. Cl. ....................................................... 360/75
(58) Field of Classification Search .................. 360/75, 360/69, 236.7
See application file for complete search history.

(56) References Cited

U.S. PATENT DOCUMENTS

| 5,388,017 | A  | * | 2/1995 | Franco et al. | 360/236.7 |
|---|---|---|---|---|---|
| 6,934,107 | B2 | * | 8/2005 | Escobar et al. | 360/69 |
| 7,136,247 | B2 | * | 11/2006 | Escobar et al. | 360/69 |
| 7,324,299 | B1 | * | 1/2008 | Schreck et al. | 360/75 |
| 2004/0085670 | A1 | * | 5/2004 | Li et al. | 360/75 |
| 2004/0264030 | A1 | * | 12/2004 | Yang | 360/69 |
| 2007/0133118 | A1 | * | 6/2007 | Kajitani | 360/75 |
| 2007/0188908 | A1 | * | 8/2007 | Kurita et al. | 360/75 |
| 2007/0195449 | A1 | * | 8/2007 | Feist et al. | 360/75 |
| 2007/0206314 | A1 | * | 9/2007 | DeRosa et al. | 360/75 |
| 2007/0268609 | A1 | * | 11/2007 | Kakiki | 360/75 |

* cited by examiner

*Primary Examiner*—Fred Tzeng
(74) *Attorney, Agent, or Firm*—Myers Bigel Sibley & Sajovec

(57) ABSTRACT

Methods of estimating a flying height of a read/write head include determining an idle period of the head since a last selection of the head as a working head, estimating the residual temperature of the head in response to the idle period, and estimating the flying height of the head in response to the estimated residual temperature of the head.

21 Claims, 3 Drawing Sheets

US 7,453,662 B2

ESTIMATING RESIDUAL TEMPERATURE FOR FLYING HEIGHT ADJUSTMENT OF READ/WRITE HEADS

RELATED APPLICATION

This application claims the benefit of and priority to U.S. Provisional Patent Application No. 60/747,619, filed May 18, 2006, the disclosure of which is hereby incorporated herein by reference as if set forth in its entirety.

FIELD

The present invention generally relates to disk drive data storage devices and, more particularly, to controlling the flying height of a read/write head relative to a rotating data storage disk of a disk drive.

BACKGROUND

Disk drives are digital data storage devices which allow host computers to store and retrieve large amounts of data in a fast and efficient manner. A typical disk drive includes a plurality of magnetic recording disks which are mounted to a rotatable hub of a spindle motor and rotated at a high speed. An array of read/write heads is disposed adjacent to data storage surfaces of the disks to transfer data between the disks and a host computer. The heads can be radially positioned over the disks by a rotary actuator and a closed loop servo system, and can fly in close proximity to the surfaces of the disks upon air bearings. The heads each typically contain a separate read element and write element.

Higher data storage density on the disks may be obtained by reading and writing data on narrower tracks on the disks and by maintaining a corresponding smaller flying height gap between the read/write elements and the data storage surfaces. The flying height of a read/write element can vary in response to air density changes in the disk drive, and in response to head temperature variations which can affect the distance that the tip of the head, where the read/write elements are located, protrudes therefrom (i.e., pole-tip protrusion). Some disk drives use a heater to controllably heat the tip of the head in order to vary the flying height of the read/write elements.

Maintaining the head flying height within an acceptable range is becoming increasingly more difficult as that range is reduced to maintain an acceptable bit error rate (BER) when data storage densities are increased. Operation outside the acceptable range may result in an unacceptable read/write BER and/or undesirable contact between a head and a data storage surface and potential loss of data and/or damage to the data storage surface.

The flying height of a read/write element may be affected by the temperature of the head. Accordingly, when estimating/controlling the flying height of the read/write element, it is desirable to estimate/control the temperature of the head. The temperature of the head may be estimated using a temperature estimation model based on the ambient temperature of the disk drive. However, most disk drives have multiple platters and multiple heads per platter. It may be difficult and/or expensive to continuously run estimation models for all of the heads of a disk drive.

SUMMARY

Some embodiments provide methods of estimating a flying height of a read/write element when switching to a selected head. The methods include determining an idle period of the read/write head since a last use of the read/write head as a working head, estimating the residual temperature of the head in response to the idle period, and estimating the flying height of the read/write element in response to the estimated residual temperature of the head.

Some embodiments provide a circuit including a flying height controller that controls a flying height of a read/write element on a head based on an estimated residual temperature since a last use of the head. The flying height controller may include a head idle timer that tracks an idle period since the last use of the head as a working head for reading/writing data, a head temperature estimator that estimates a temperature of a head in response to the head idle timer, and a heater controller that controls a heater element associated with the read/write element in response to the estimated temperature of the head.

A disk drive according to some embodiments includes a data storage disk and a head that flies on an air bearing proximate the data storage disk and that includes a read/write element that reads data from and writes data to the data storage disk. The disk drive includes a head temperature estimator that determines an idle period of a read/write head since a last selection of the head as a working head for reading/writing data, and that estimates the residual temperature of the head in response to the idle period, and a flying height controller that controls the flying height of the read/write element in response to the estimated residual temperature of the head.

DETAILED DESCRIPTION

The present invention now will be described more fully hereinafter with reference to the accompanying drawings, in which embodiments thereof are shown. This invention may, however, be embodied in many alternate forms and should not be construed as limited to the embodiments set forth herein.

Accordingly, while some embodiments are susceptible to various modifications and alternative forms, specific embodiments thereof are shown by way of example in the figures and will herein be described in detail. It should be understood, however, that there is no intent to limit the invention to the particular forms disclosed, but on the contrary, the invention includes all modifications, equivalents, and alternatives falling within the spirit and scope thereof as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Figure 1:
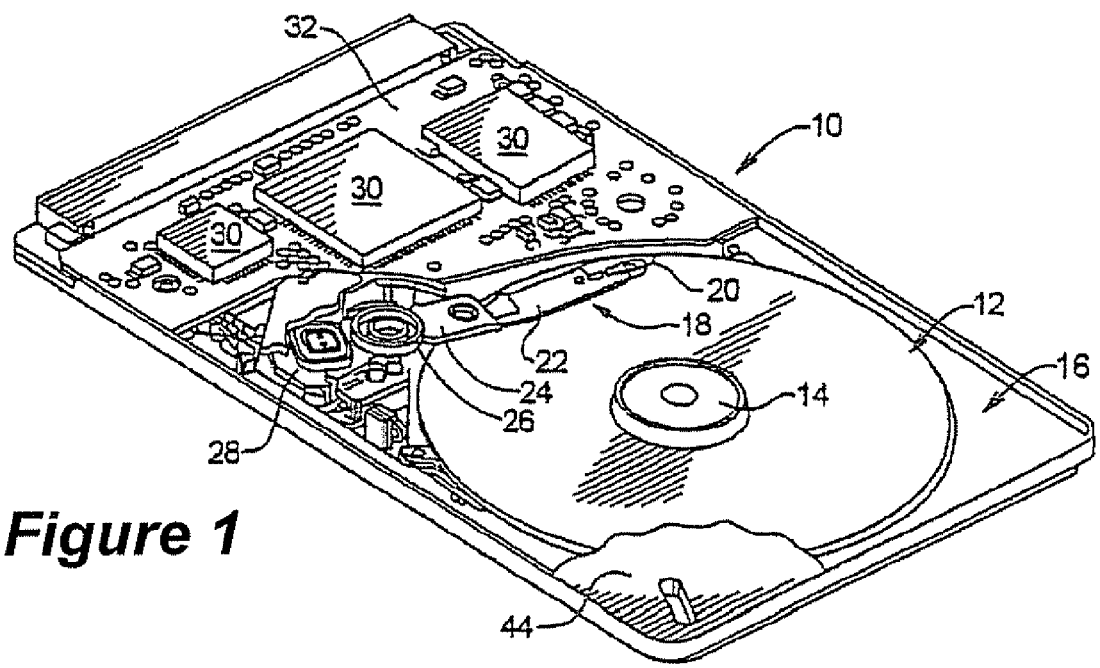
FIG. 1 is a perspective view of a disk drive with electronic circuits that are configured in accordance with some embodiments.
Figure 2:
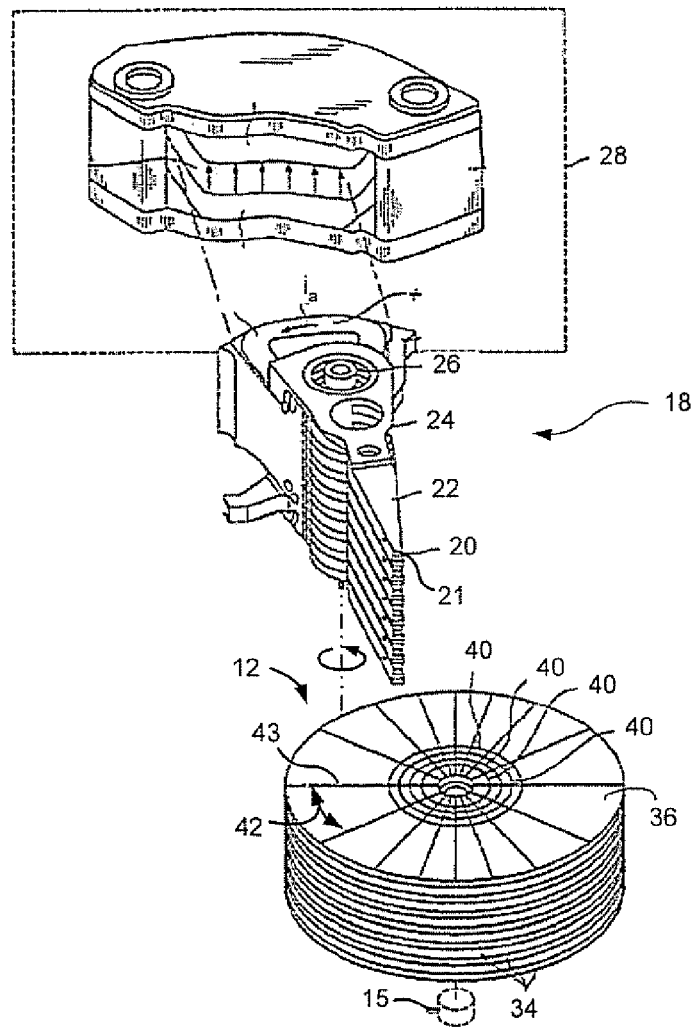
FIG. 2 is a diagram of an exemplary head disk assembly of the disk drive.

A simplified diagrammatic representation of a disk drive, generally designated as 10, is illustrated in FIG. 1. The disk drive 10 includes a disk stack 12 (illustrated as a single disk in FIG. 1) that is rotated about a hub 14 by a spindle motor 15 (FIG. 2). The spindle motor 15 is mounted to a base plate 16. An actuator arm assembly 18 is also mounted to the base plate 16. The disk drive 10 is configured to store and retrieve data responsive to write and read commands from a host device. A host device can include, but is not limited to, a desktop computer, a laptop computer, a personal digital assistant (PDA), a digital video recorder/player, a digital music recorder/player, and/or another electronic device that can be communicatively coupled to store and/or retrieve data in the disk drive 10.

The actuator arm assembly 18 includes a read/write head 20 that includes a read/write element (or transducer) 21 mounted to a flexure arm 22 which is attached to an actuator arm 24 that can rotate about a pivot bearing assembly 26. The read/write element 21 may, for example, include a magnetoresistive (MR) element and/or a thin film inductive (TFI) element. The actuator arm assembly 18 also includes a voice coil motor (VCM) 28 which radially moves the head 20 across the disk stack 12. The spindle motor 15 and actuator arm assembly 18 are coupled to a controller, read/write channel circuits, and other associated electronic circuits 30 which are configured in accordance with at least one embodiment, and which can be enclosed within one or more integrated circuit packages mounted to a printed circuit board (PCB) 32. The controller, read/write channel circuits, and other associated electronic circuits 30 are referred to below as a "controller" for brevity. The controller 30 may include analog circuitry and/or digital circuitry, such as a gate array and/or microprocessor-based instruction processing device.

Referring now to the illustration of FIG. 2, the disk stack 12 typically includes a plurality of disks 34, each of which may have a pair of disk surfaces 36. The disks 34 are mounted on a cylindrical shaft and are rotated about an axis by the spindle motor 15.

The actuator arm assembly 18 includes a plurality of the heads 20, each of which is positioned to be adjacent to a different one of the disk surfaces 36. Each head 20 is mounted to a corresponding one of the flexure arms 22. The VCM 28 operates to move the actuator arm 24, and thus moves the heads 20 across their respective disk surfaces 36. The heads 20 are configured to fly on an air cushion relative to the data recording surfaces 36 of the rotating disks 34 while writing data to the data recording surface responsive to a write command from a host device or while reading data from the data recording surface to generate a read signal responsive to a read command from the host device.

FIG. 2 further illustrates tracks 40 and spokes 43 on the disks 34. Data is stored on the disks 34 within a number of concentric tracks 40 (or cylinders). Each track 40 is divided into a plurality of radially extending sectors 42 separated by radially extending spokes 43. Each sector is further divided into a servo sector and a data sector. The servo sectors of the disks 34 are used, among other things, to accurately position the head 20 so that data can be properly written onto and read from a selected one of the disks 34. The data sectors are where non-servo related data (i.e., host device data) is stored and retrieved.

Figure 3:
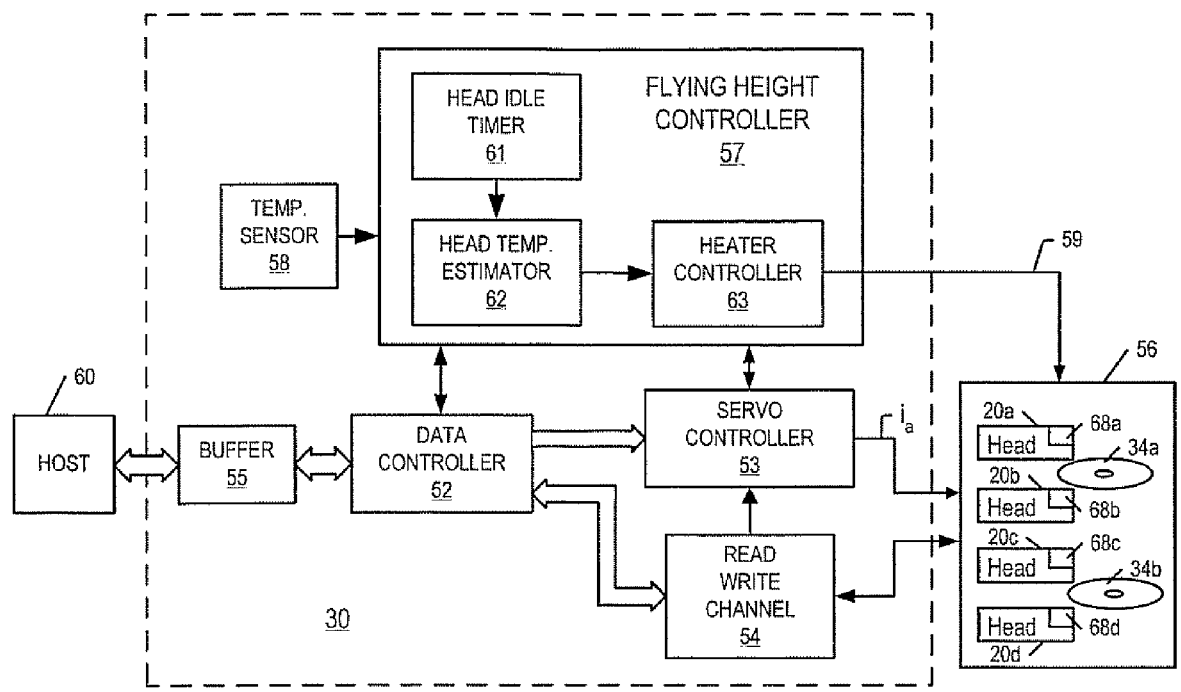
FIG. 3 is a block diagram of a portion of the controller of the disk drive shown in FIG. 1 and associated methods that are configured in accordance with some embodiments.

FIG. 3 is a block diagram of a host device 60 that is communicatively connected to a portion of the controller 30 of the disk drive 10 shown in FIG. 1 according to some embodiments. The controller 30 can include a data controller 52, a servo controller 53, a read write channel 54, a buffer 55, a flying height controller 57, and an air temperature sensor 58. The flying height controller 57 includes a head idle timer 61, a head temperature estimator 62, and a heater controller 63. Although the controllers 52, 53, and 57, the buffer 55, the head temperature estimator 62 and the read write channel 54 have been shown as separate blocks for purposes of illustration and discussion, it is to be understood that their functionality described herein may be integrated within a common integrated circuit package or distributed among more than one integrated circuit package. Furthermore, although the head idle timer 61, the head temperature estimator 62, and the heater controller 63 are shown as separate blocks within the flying height controller 57 for purposes of illustration and discussion, it is to be understood that their functionality of those blocks may be integrated within a common integrated circuit package or distributed among more than one integrated circuit package. The head disk assembly (HDA) 56 can include a plurality of the disks 34a-b, a plurality of the heads 20a-d mounted to the actuator arm assembly 18 and positioned adjacent to different data storage surfaces of the disks 34a-b, the VCM 28, and the spindle motor 15. In general, there may be two heads 20 per disk platter 34. Thus, in a 4-platter drive, there may be eight heads 20. The number of heads in a disk drive may be generally referred to herein as N.

Write commands and associated data from the host device 60 are buffered in the buffer 55. The data controller 52 is configured to carry out buffered write commands by formatting the associated data into blocks with the appropriate header information, and transferring the formatted data from the buffer 55, via the read/write channel 54, to logical block addresses (LBAs) on the disk 34 identified by the associated write command.

The read write channel 54 can operate in a conventional manner to convert data between the digital form used by the data controller 52 and the analog form conducted through the heads 20 in the IDA 56. The read write channel 54 provides servo positional information read from the HDA 56 to the servo controller 53. The servo positional information can be used to detect the location of the head 20 in relation to LBAs on the disk 34. The servo controller 53 can use LBAs from the data controller 52 and the servo positional information to seek the head 20 to an addressed track and block on the disk 34, and to maintain the head 20 aligned with the track while data is written/read on the disk 34.

The heater controller 63 in the flying height controller 57 is configured to controllably heat the heads 20 to control flying heights of read/write elements 21 on the heads 20 relative to the data recording surfaces 36 of the disks 34. With continuing reference to FIG. 3, the HFDA 56 includes a plurality of heater elements 68a-d attached to different ones of the heads 20a-d. The heater controller 63 generates a heater signal 59 which is conducted through the heater elements 68a-d to generate heat therefrom and, thereby, heat the heads 20a-d. The heater controller 63 controls the height adjustment heater signals 59 to control heating of the heads 20a-d and cause a controllable amount of thermally-induced elastic deformation of the heads 20a-d and, thereby, control the flying heights of the heads 20a-d. Since there may be only one heater signal 59 signal coming out of heater controller 63, only one heater element 68a-d may be actively controlled and actuated at any given time. The other three heater elements 63a-d may not be actuated, and the temperatures of the corresponding heads 20a-d may decrease after previous actuations.

While reading data through a selected head 20, the flying height controller 57 can set the heater signal 59 to a predefined signal level, referred to as an operational Read Steady-State (RSS) heater signal level, to provide a defined amount of heating to the selected head 20 and result in a head flying height within an acceptable range. However, due to variation in manufacturing tolerances, some heads may exhibit a different flying height response than other heads when their associated heater elements are subjected to the same operational RSS heater signal level, when they are subjected to the same read-writing duty cycles, and/or when subjected to the same air pressure/humidity conditions.

Embodiments may be used in conjunction with a flying height controller 57. In order to determine an appropriate level of the heater signal 59, the head temperature estimator 62 may estimate the head temperature of a selected head 20. The estimation of current temperature of a selected head 20 may be computed based on an experimental model using a known time constant τ that corresponds to a heat dissipation time constant of the associated heater element 68. In some embodiments, a multiple time constant model (e.g. using $\tau_1$, $\tau_2$, etc.) may be used.

To dynamically estimate the flying height of a selected working head 20 under non-steady-state conditions, when it is initially selected as a new working head, it may be desirable to estimate the residual temperature of the new working head due to a previous actuation event. As used herein, the "working head" refers to the head 20 that will be used to perform, or is currently performing read/write operations, and that may be currently being supplied with a heater signal 59 to maintain the head 20 at a desired flying height. The head temperature, and thus the flying height, of the working head may be continuously estimated by the head temperature estimator 62 using a mathematical model. When a head switch occurs, such that a different working head 20 (i.e. the "new working head") is selected, it is desirable to estimate the temperature/flying height of the new working head 20 in order to supply initial conditions to the head temperature estimator 62 for the new working head 20. The temperature/flying height of the new working head 20 may then be adjusted using a heater signal 59 to the heater element 68 associated with the new working head 20 by the heater controller 63.

Some embodiments provide methods of estimating the temperature/flying height of a new working head 20 based on residual temperature that may be remaining in the associated heater element 68 from the last time the new working head 20 was selected. The idle time since the last time the new working head was selected may be provided to the head temperature estimator by a head idle timer 61 that keeps track of when the heads 20 are selected and/or de-selected.

It may be possible to monitor the flying height of all N heads by running N exponential models simultaneously. In that case, when the residual flying height information is needed for the new working head, it may be readily available. However, the computation costs associated with running all N exponential models simultaneously may be very high. That is, significant processor time may be required to simultaneously run all N exponential models.

According to some embodiments, an exponential model may be run only for a current working head. The head idle timer 61 may keep track of the amount of time that the remaining N-1 heads are not being actively actuated. At the time of a switch from a previously selected working head to a new working head, the residual temperature of the new working head may be estimated by the head temperature estimator 62 using linear interpolation of values obtained from a pre-computed exponential table. This estimated residual temperature may be used in the exponential model as an initial condition for the new working head. Thus, the overall processor time required to keep track of head flying heights may be relatively low when performing read/write operations on the working head or during head switching.

Various embodiments may thereby require minimal computation time/power. In particular, embodiments may require only estimation of an exponential heat dissipation factor $g^k$ using pre-computed tables, including an exponential table and a linear interpolation table. Both the exponential table and the linear interpolation table may be pre-calculated and stored so as to be accessible by the head temperature estimator 62. In addition, both the exponential table and the linear interpolation table may be configured such that the appropriate table entry may be rapidly obtained based on the number of discrete time intervals, such as a spoke count, for which the new working head was idle before being selected.

The temperature of a head 20 can be modeled by one or multiple first order time linear systems when actuated by the heater element 68. The calculation of residual temperature during head switching uses the quantity $y(t-T) \cdot \tau^T$, where t is the current time, T is the time interval between the current time and the last time the estimated temperature of the new working head 20 was recorded, y(t−T) is the last temperature value recorded for the new working head 20 at time (t−T), and τ is the heat dissipation time constant of the new working head 20 and/or the heater element 68 associated with the new working head 20. In the discrete time domain, this quantity may be expressed as $y(n-k) \cdot g^k$, where n is the current time index, k is the number of discrete time intervals (e.g. spoke crossings) since the temperature of the new working head was last recorded, y(n−k) is the last temperature value of the new working head at time (n−k), and $g^k$ is the exponential dissipation factor. Thus, the value of $g^k$ is computed or estimated in order to determine the residual temperature on the new working head.

As noted above, two static tables—an exponential table and a linear interpolation table—may be used in some embodiments. The first, fhaExpTable, is a table of pre-computed exponential values as follows:

$$\text{fhaExpTable} = [g^{2^0} g^{2^1} g^{2^2} g^{2^3} g^{2^4} g^{2^5} g^{2^6} g^{2^7} g^{2^k}]$$

The second static table contains pre-computed interpolation factors, as follows:

$$\text{fhaExpInterpFactor} = \left[\frac{g^{2^1} - g^{2^0}}{2^1 - 2^0} \frac{g^{2^2} - g^{2^1}}{2^2 - 2^1} \frac{g^{2^3} - g^{2^2}}{2^3 - 2^2} \frac{g^{2^4} - g^{2^3}}{2^4 - 2^3} \frac{g^{2^5} - g^{2^4}}{2^5 - 2^4} \frac{g^{2^6} - g^{2^5}}{2^6 - 2^5} \frac{g^{2^7} - g^{2^6}}{2^7 - 2^6} \frac{g^{2^8} - g^{2^7}}{2^8 - 2^7}\right]$$

In addition, some dynamic tables may be used in some embodiments: the first table (referred to as spokes_not_on_this_head) keeps track of the number of time intervals (e.g. spoke crossings) that a corresponding head is a non-working head. The second table (referred to as last_flight_height) keeps track of y(n−k), which is an indication of the most recent estimated flying height for each head. These tables are dynamic tables that may be updated each time a new working head is selected.

By linear interpolation using the pre-computed exponential and linear interpolation tables fhaExpTable and fhaExpInterpFactor, the value of $g^k$ can be estimated according to the following equation:

$$\hat{g}^k = g^{2^p} + \frac{g^{2^{p+1}} - g^{2^p}}{2^{p+1} - 2^p} \cdot (k - 2^p) \quad (1)$$

This equation may be evaluated as:

$$\hat{g}^k = \text{fhaExpTable}(p) + \text{fhaExpInterpFactor}(p) \cdot (k - 2^p) \quad (2)$$

where p is the bit index number of the most significant bit of k, beginning with index 0. On some processors, the most significant bit of k can be processed in a single cycle. This number may be used as the index to both fhaExpTable and fhaExpInterpFactor tables. Thus, the values of fhaExpTable (p) and fhaExpInterpFactor(p) may be obtained rapidly.

For example, for a binary value of k>0, such as k=001xxxxx, then p is equal to the index of the most significant bit of k. Thus, in this example, p=5. By using p as the index into fhaExpTable and fhaExpInterpFactor table, only the location of the most significant bit of k needs to be obtained. This arrangement may result in fast indexing. Furthermore, the size of the table may be kept relatively compact with index exponential indexing.

However, it will be appreciated that fhaExpTable could be based on k instead of $2^k$, in which case the table would be larger and may be indexed more slowly. The values of fhaExpInterpFactor would also be modified accordingly.

Figure 4:
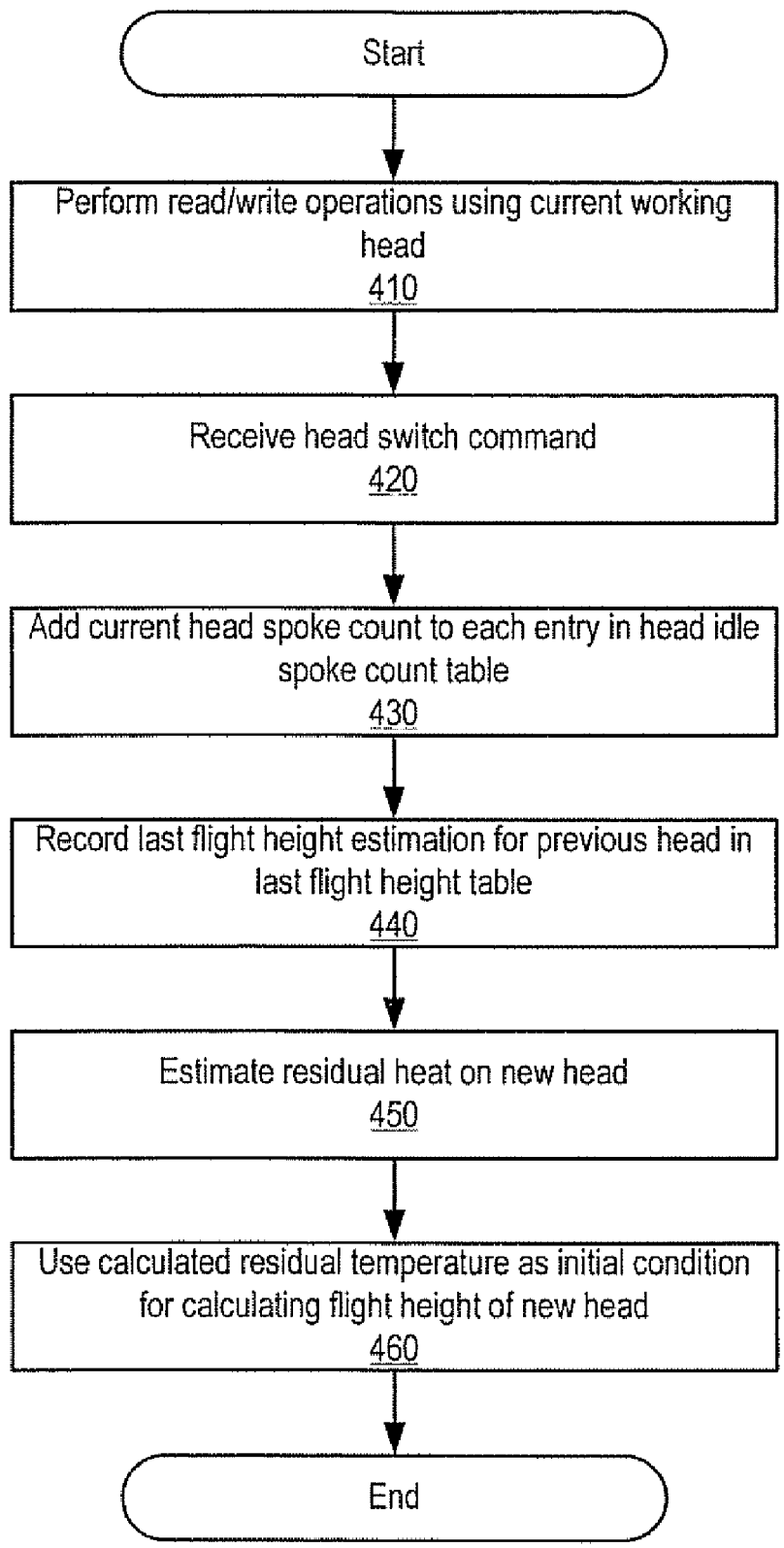
FIG. 4 is a flow chart that illustrates operations for estimating residual temperature of a head in accordance with some embodiments.

Operations according to some embodiments are illustrated in FIG. 4. While performing read/write operations on a current working head 20 (Block 410), a count of the current number of spokes that read/write operations are being performed on the current working head (current_head_spoke) is updated, for example, at each servo spoke. The flying height of the current working head 20 is calculated using the exponential flying height estimation model for the working head only.

When a command is received to switch to a new working head (Block 420), the current head spoke count (current_head_spoke) is added to each entry of the table spokes_not_on_this_head for each head (Block 430). The current_head_spoke count is cleared, as is the value of spokes_not_on_this_head for the previous working head.

Next, the last flying height estimation for the previous working head is recorded in a corresponding entry in the last_flight_height table (Block 440), in order to facilitate estimation of the residual temperature in the previous working head the next time it is selected.

The residual temperature of the new working head is then estimated (Block 450). The quantity $y(n-k) \cdot g^k$ may be used as the initial temperature/flying height estimate for the new working head (Block 460). The value for y(n−k) may be chosen from the corresponding entry in the last_flight_height table for the new working head, and $g^k$ may be estimated using an approximation method as described above. Namely, the estimate of $g^k$ (i.e., $\hat{g}^k$) may be obtained according to Equation (2) above using entries selected from the exponential table fhaExpTable and the linear interpolation table fhaExpInterpFactor based on the index of the most significant bit of k. If a multiple time constant model is being used, this step may be repeated for each model (e.g., $\tau_1$, $\tau_2$, etc.) to obtain the residual temperature of the new working head.

Figure 5:
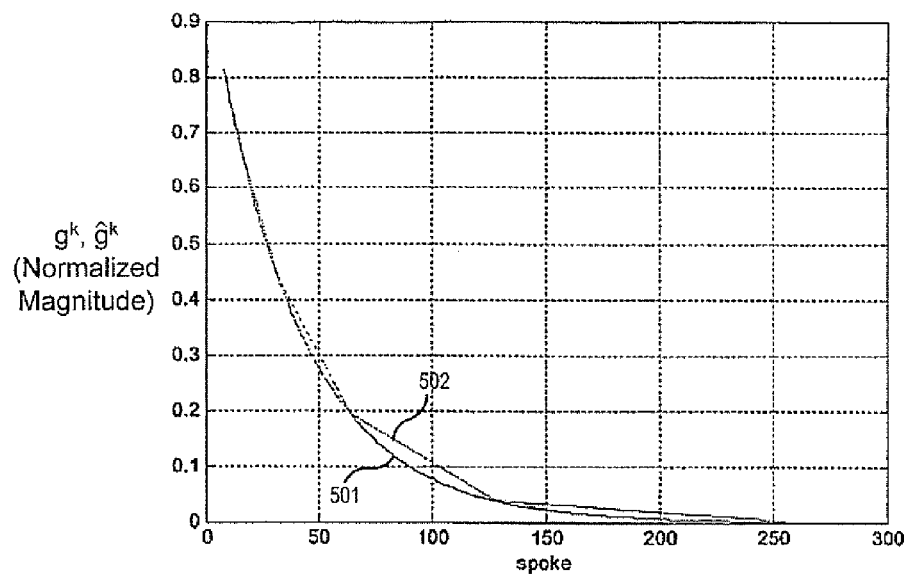
FIG. 5 is a graph of a calculated exponential function and an estimated exponential function used in connection with some embodiments.

FIG. 5 is a graph of $g^k$ (Curve 501) and $\hat{g}^k$ (piece-wise linear Curve 502) versus time (in spoke crossings, or spokes). As can be seen in FIG. 5, the absolute error between $g^k$ and $\hat{g}^k$ is relatively small—less than 4% in normalized magnitude. The relative error between $g^k$ and $\hat{g}^k$ may be largest at relatively large values of k. However, in general, it is the absolute residual temperature that matters for purposes of determining pole-tip protrusion, and the absolute residual temperature becomes small at large values of k. In addition, the flying height estimation error due to initial absolute residual temperature error decreases exponentially over time.

In some embodiments, the curve for $\hat{g}^k$ may be chosen so that the points on the curve do not fall precisely on the curve for $g^k$. For example, the curve for $\hat{g}^k$ may be shifted slightly left to reduce or minimize the overall error between $g^k$ and $\hat{g}^k$. In some cases, the curve for $\hat{g}^k$ may be shifted to reduce or minimize the MSE error between $g^k$ and $\hat{g}^k$. In other cases, the curve for $\hat{g}^k$ may be shifted to reduce or minimize the worst-case error between $g^k$ and $\hat{g}^k$.

Accordingly, some embodiments provide methods of estimating a flying height of a read/write element when switching to a head. The methods include determining an idle period of the read/write head since a last use of the read/write head as a working head, estimating the residual temperature of the head in response to the idle period, and estimating the flying height of the read/write element in response to the estimated residual temperature of the head.

Estimating the residual temperature of the head may include retrieving a stored indication of the temperature of the head just prior to the idle period of the head, retrieving an exponential table entry using an index derived from a discrete number k that is indicative of the idle period, retrieving an interpolation factor associated with the exponential table entry, and calculating an estimated dissipation factor $\hat{g}^k$ using the exponential table entry and the interpolation factor.

Estimating the residual temperature of the head may include estimating the residual temperature of the head based on the stored temperature indication and the estimated dissipation factor.

The index may be derived from a bit index number of the most significant bit of k. In some embodiments, the index may be k itself. The index may be used to select an entry in the exponential table that is lower than and closest to an actual dissipation factor $g^k$ associated with the head, and calculating the estimated dissipation factor $\hat{g}^k$ may include interpolating the selected table entry to obtain the estimated dissipation factor $\hat{g}^k$.

The values of the exponential table may be offset from the values of $g^{2^p}$ to reduce an error between the estimated dissipation factor $\hat{g}^k$ and the actual dissipation factor $g^k$.

The exponential table may have entries of the form $g^{2^p}$, and the interpolation factor may have the form $$\frac{g^{2^{p+1}} - g^{2^p}}{2^{p+1} - 2^p},$$

where p is the bit index number of the most significant bit of k. The estimated dissipation factor $\hat{g}^k$ may be calculated as $$\hat{g}^k = g^{2^p} + \frac{g^{2^{p+1}} - g^{2^p}}{2^{p+1} - 2^p} \cdot (k - 2^p).$$

The residual temperature of the head may be calculated as $y(n-k) \cdot \hat{g}^k$.

The idle period of the read/write head may include k discrete time intervals, and determining k may include retrieving a value of k stored for the head and adding to k a number of discrete time intervals of operation of a previously selected head.

The methods may further include storing an indication of the idle period of the head, and storing an indication of the temperature of the head just prior to the idle period. The methods may further include updating the indication of the idle period for the head after each discrete time period. The disk may include a plurality of spokes defined by servo sectors thereon, and the discrete time interval may correspond to the passing of a spoke beneath the transducer.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method of estimating a flying height of a read/write element, the method comprising:
   determining an idle period of a head on which the read/write element is located since a last use of the head as a working head for reading/writing data;
   estimating the residual temperature of the head in response to the idle period; and
   providing the estimated residual temperature of the read/write head as an input to a flying height controller.

2. The method of claim 1, wherein estimating the residual temperature of the read/write element comprises:
   retrieving a stored indication of the temperature of the head just prior to the idle period of the head;
   retrieving an exponential table entry using an index derived from a discrete number k that is indicative of the idle period;
   retrieving an interpolation factor associated with the exponential table entry; and
   calculating an estimated dissipation factor $\hat{g}^k$ using the exponential table entry and the interpolation factor.

3. The method of claim 2, wherein estimating the residual temperature of the read/write head comprises estimating the residual temperature of the read/write head based on the stored temperature indication and the estimated dissipation factor.

4. The method of claim 2, wherein the index is derived from a bit index number of the most significant bit of k.

5. The method of claim 4, wherein the index is used to select an entry in the exponential table that is lower than and substantially closest to an actual dissipation factor $g^k$ associated with the head, and wherein calculating the estimated dissipation factor $\hat{g}^k$ comprises the table entry to obtain the estimated dissipation factor $\hat{g}^k$.

6. The method of claim 5, wherein the values of the exponential table are offset from the values of $g^{2^p}$ to reduce an error between the estimated dissipation factor $\hat{g}^k$ and the actual dissipation factor $g^k$.

7. The method of claim 5, wherein the exponential table has entries of the form $g^{2^p}$, and wherein the interpolation factor has the form $$\frac{g^{2^{p+1}} - g^{2^p}}{2^{p+1} - 2^p},$$

where p is the bit index number of the most significant bit of k, and wherein the estimated dissipation factor $\hat{g}^k$ is calculated as $$\hat{g}^k = g^{2^p} + \frac{g^{2^{p+1}} - g^{2^p}}{2^{p+1} - 2^p} \cdot (k - 2^p).$$

8. The method of claim 7, wherein the residual temperature of the head is calculated as $y(n-k) \cdot \hat{g}^k$.

9. The method of claim 1, wherein the idle period of the head comprises k discrete time intervals, and wherein determining k comprises retrieving a value of k stored for the head and adding to k a number of discrete time intervals of operation of a previously selected head.

10. The method of claim 1, further comprising:
    storing an indication of the idle period of the head; and
    storing an indication of the temperature of the head just prior to the idle period.

11. The method of claim 10, further comprising updating the indication of the idle period for the head after each discrete time period.

12. The method of claim 1, wherein the disk includes a plurality of spokes defined by servo sectors thereon, and wherein the discrete time interval corresponds to the passing of a spoke beneath the read/write element.

13. The method of claim 1, further comprising:
    estimating the flying height of the read/write element in response to the estimated residual temperature of the head; and
    controlling a heater signal for a heater element associated with the read/write element in response to the estimated flying height of the read/write element.

14. A circuit, comprising:
- a head temperature estimator that estimates a residual temperature of a head on which a read/write element is located since a last use of the read/write element; and
- a heater controller that controls a heater element associated with the read/write element in response to the estimated residual temperature of the head to control a flying height of the read/write element based on the estimated residual temperature of the head.

15. The circuit of claim 14, further comprising:
- a head idle timer that tracks an idle period since the last use of the head as a working head for reading/writing data;
- wherein the head temperature estimator estimates the residual temperature of the head in response to the head idle timer.

16. The circuit of claim 15, wherein the head temperature estimator, the heater controller and the head idle timer comprise a flying height controller, and wherein the flying height controller estimates the flying height of the read/write element in response to the estimated residual temperature of the head.

17. The circuit of claim 16, wherein the head temperature estimator further retrieves a stored indication of the temperature of the head just prior to the idle period of the head, retrieves an exponential table entry using an index derived from the idle period, retrieves an interpolation factor using an index derived from the idle period, and calculates an estimated dissipation factor $\hat{g}^k$ using the exponential table entry and the interpolation factor.

18. The circuit of claim 17, wherein the head temperature estimator estimates the residual temperature of the head based on the stored temperature indication and the estimated dissipation factor.

19. The circuit of claim 17, wherein the index is derived from a bit index number of the most significant bit of k, and wherein the head temperature estimator uses the index to select an entry in the exponential table that is lower than and substantially closest to an actual dissipation factor $\hat{g}^k$ associated with the head, and wherein the head temperature estimator interpolates the selected table entry to obtain the estimated dissipation factor $\hat{g}^k$.

20. The circuit of claim 19, wherein the exponential table has entries of the form $g^{2^p}$, and wherein the interpolation factor has the form $$\frac{g^{2^{p+1}} - g^{2^p}}{2^{p+1} - 2^p},$$

where p is the bit index number of the most significant bit of k, and wherein the estimated dissipation factor $\hat{g}^k$ is calculated as $$\hat{g}^k = g^{2^p} + \frac{g^{2^{p+1}} - g^{2^p}}{2^{p+1} - 2^p} \cdot (k - 2^p).$$

21. A disk drive, comprising:
- a data storage disk;
- a head that flies on an air bearing proximate the data storage disk and that includes a read/write element that reads data from and writes data to the data storage disk;
- a head temperature estimator that determines an idle period of the head since a last selection of the head as a working head for reading/writing data, and that estimates the residual temperature of the head in response to the idle period; and
- a flying height controller that controls the flying height of the read/write element in response to the estimated residual temperature of the head.

* * * * *

UNITED STATES PATENT AND TRADEMARK OFFICE
CERTIFICATE OF CORRECTION

PATENT NO.         : 7,453,662 B2                                              Page 1 of 1
APPLICATION NO.    : 11/685260
DATED              : November 18, 2008
INVENTOR(S)        : Luo It is certified that error appears in the above-identified patent and that said Letters Patent is hereby corrected as shown below:

Column 10, Claim 5, Line 19: Please correct "comprises the table entry"
　　　　　　　To read -- comprises interpolating the selected table entry --

Signed and Sealed this

Seventeenth Day of February, 2009

JOHN DOLL
*Acting Director of the United States Patent and Trademark Office*